(12) United States Patent
Chen

(10) Patent No.: US 7,862,236 B2
(45) Date of Patent: Jan. 4, 2011

(54) CIRCUMROTATING CIRCULATING GUIDING ASSEMBLY OF LINEAR SLIDING RAIL

(75) Inventor: Chiu-Tsun Chen, Taipei County (TW)

(73) Assignee: OME Technology Co., Ltd., Taipei County (TW)

( * ) Notice: Subject to any disclaimer, the term of this patent is extended or adjusted under 35 U.S.C. 154(b) by 706 days.

(21) Appl. No.: 11/845,341

(22) Filed: Aug. 27, 2007

(65) Prior Publication Data
US 2008/0292227 A1 Nov. 27, 2008

(30) Foreign Application Priority Data
May 21, 2007 (TW) .............................. 96208229 U

(51) Int. Cl.
*F16C 29/06* (2006.01)
(52) U.S. Cl. .......................................... 384/45; 384/43
(58) Field of Classification Search .................. 384/43, 384/44, 45
See application file for complete search history.

(56) References Cited
U.S. PATENT DOCUMENTS
5,193,914 A * 3/1993 Tanaka ........................ 384/45

6,712,511 B2 * 3/2004 Matsui et al. ................. 384/45
6,729,760 B2 * 5/2004 Mochizuki et al. ............ 384/45
7,150,564 B2 * 12/2006 Lee .............................. 384/45

* cited by examiner

*Primary Examiner*—Thomas R Hannon
*Assistant Examiner*—James Pilkington
(74) *Attorney, Agent, or Firm*—Rosenberg, Klein & Lee

(57) ABSTRACT

A circumrotating circulating guiding assembly of a linear sliding rail includes a sliding base body, a plurality of guiding assembly and a plurality of rolling elements. The sliding base body has a plurality of engaging portions and a plurality of guiding holes. The sliding base body is provided longitudinally with engaging portions. The guiding assembly comprises two circumrotating guiding portions, a plurality of fixing portions, a spacer and a plurality of guiding tubes. The fixing piece is fixed to the engaging portion. The guiding portion is combined with the circumrotating guiding portion. The rolling element is provided on the circumrotating circulating path in a rolling manner. With the fixing pieces being fixed to the engaging portion, and the spacer being engaged in the recessed portion, the insufficient strength of the guiding assembly formed of plastic materials can be compensated, thereby avoiding the vibration, noise and excessive frictional resistance efficiently.

11 Claims, 10 Drawing Sheets

CIRCUMROTATING CIRCULATING GUIDING ASSEMBLY OF LINEAR SLIDING RAIL

BACKGROUND OF THE INVENTION

1. Field of the Invention

The present invention relates to a circumrotating circulating guiding assembly of a linear sliding rail, and in particular to a circumrotating circulating guiding assembly of a linear sliding rail that allows rolling elements to roll stably between a sliding base body and the sliding rail, thereby performing a predetermined precise circumrotating circulating movement.

2. Description of Related Art

Linear sliding rail device can perform a relative movement with high precision, and is usually applied to a tool machine such as CNC. Thus, it can perform a precise adjustment and move the supported article to the subsequent high-precision process.

Conventional linear sliding rail includes a sliding base body, a sliding rail, a guiding assembly and a plurality of rolling elements.

The sliding base body is slidably provided on the sliding rail and has opposing guiding holes. The guiding assembly is provided between the sliding base body and the sliding rail. Via the above arrangement, a circumrotating circulating path can be formed. The rolling elements perform a circumrotating circulating movement in such a manner that they roll at high speed on the circumrotating circulating path. With the action of the rolling elements, the sliding base body can perform a stepless, linear and precise movement on the sliding rail, thereby achieving the effects of adjusting precisely and moving the relative position of the supported article.

However, the conventional linear sliding rail is not stable in operation. When the rolling elements perform a high-speed circumrotating circulating movement between the sliding rail and the sliding base, a relatively high stability should be maintained so as to allow the linear sliding rail to perform a precise movement. Generally, the guiding assembly is made of plastic materials. When the rolling elements move at high speed along the guiding assembly, since the strength of the plastic material is lower, the guiding assembly and the rolling elements may generate vibration, noise and excessive frictional resistance between the sliding base body and the sliding rail easily, so that the stability and lifetime of the linear sliding rail can be affected directly or indirectly.

Therefore, in view of the above the drawbacks, the inventor proposes the present invention to overcome the above problems based on his deliberate researches.

SUMMARY OF THE INVENTION

The object of the present invention is to provide a circumrotating circulating guiding assembly of a linear sliding rail, whereby the vibration, noise, and excessive frictional resistance can be avoided during the operation the linear sliding rail.

In order to achieve the above object, the present invention provides a circumrotating circulating guiding assembly of a linear sliding rail, which includes a sliding rail, a sliding base body, a plurality of guiding assemblies and a plurality of rolling elements. The sliding base body has an accommodating space, a plurality of engaging portions, two recessed portions and a plurality of guiding holes. The accommodating space is recessed to accommodate the sliding rail. The engaging portions and the recessed portions being provided longitudinally on inner edge surfaces of the sliding base body. The guiding holes penetrate through front and rear end faces of the sliding base body. The plurality of guiding assemblies is provided in the accommodating space to straddle the front and rear end faces of the sliding base body and correspond to the engaging portions and the guiding holes. Each of the guiding assemblies includes two circumrotating guiding portions, a plurality of fixing pieces, a spacer and a plurality of guiding tubes. The two circumrotating guiding portions are provided on the front and rear ends of the sliding base body. The fixing pieces and the spacer are provided between the two circumrotating guiding portions. The fixing portions are fixed to the engaging portions. One side of the spacer is engaged in the recessed portion. The guiding tubes are inserted individually into the guiding holes. Each of the two circumrotating guiding portions has a plurality of first combining portions. Both ends of each guiding tube have a second combining portion. The first combining portion is provided in the guiding hole and combined with the second combining portion. The sliding rail, the sliding base body and the guiding assembly together form a circumrotating circulating path. The plurality of rolling elements is provided on the circumrotating circulating path in a rolling manner.

The present invention has the following effect: with the fixing pieces of the guiding assembly being fixed to the engaging portions of the sliding base body, and the spacer being engaged in the recessed portion, the insufficient strength of the guiding assembly formed of plastic materials can be compensated, so that the rolling elements can perform a circumrotating circulating movement stably along the guiding assembly, thereby avoiding the vibration, noise and excessive frictional resistance. In this manner, the stability in the action of the linear sliding rails can be enhanced and the lifetime thereof can be extended.

In order to further understand the characteristics and technical contents of the present invention, a detailed description related thereto will be explained with reference to the accompanying drawings. However, it should be understood that the drawings and the description are illustrative but not used to limit the scope of the present invention.

DETAILED DESCRIPTION OF THE PREFERRED EMBODIMENTS

FIGS. 1 to 6 show a circumrotating circulating guiding assembly of a linear sliding rail of the present invention, which includes a sliding rail 1, a sliding base body 2, two guiding assemblies 3 and a plurality of rolling elements 4. Through this arrangement, the rolling elements 4 can be guided to perform a predetermined circumrotating circulating movement, thereby allowing the sliding base body 2 to generate a relative and linear movement on the sliding rail 1.

Figure 1:
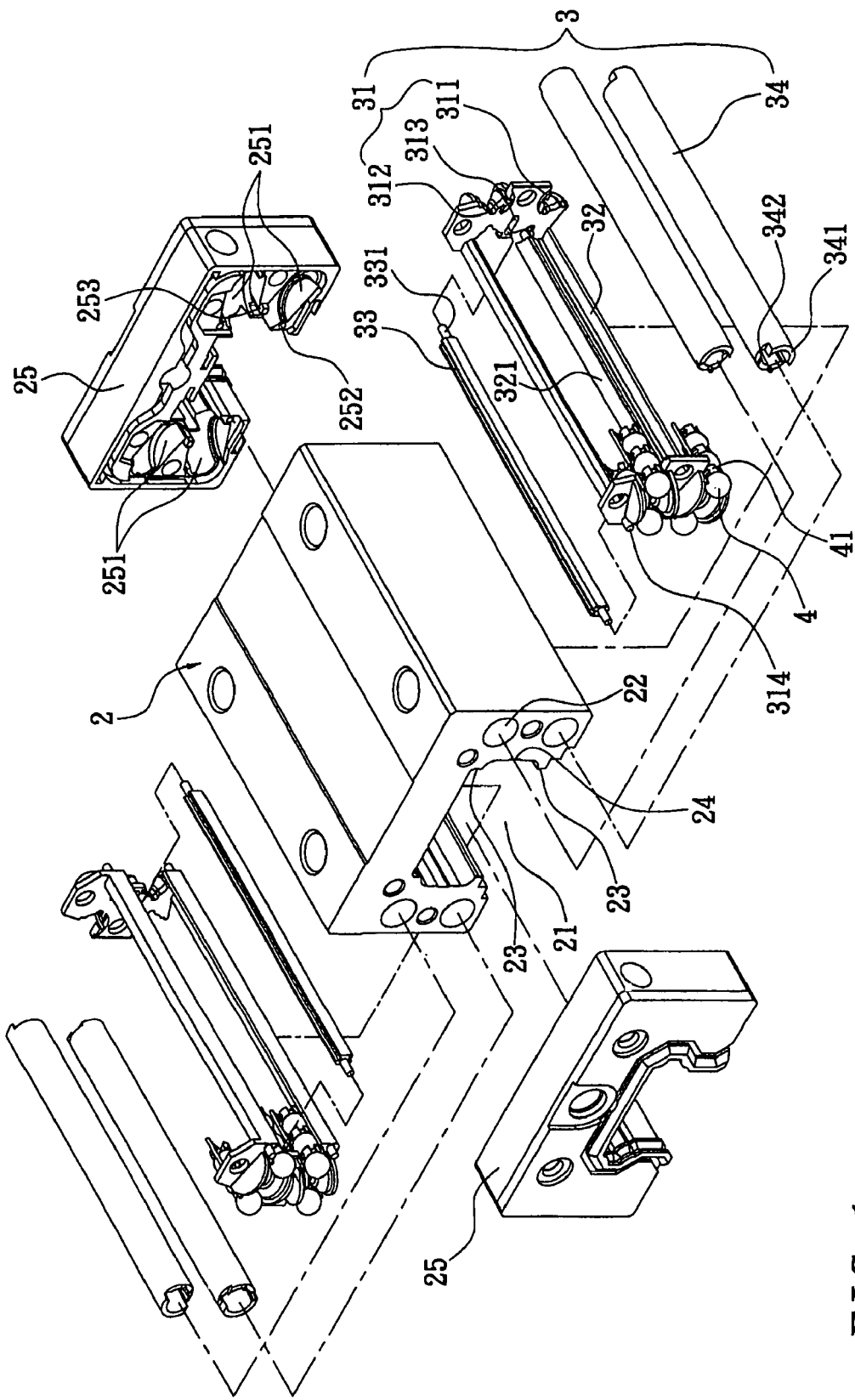
FIG. 1 is an exploded view showing the circumrotating circulating guiding assembly of a linear sliding rail of the present invention.
Figure 2:
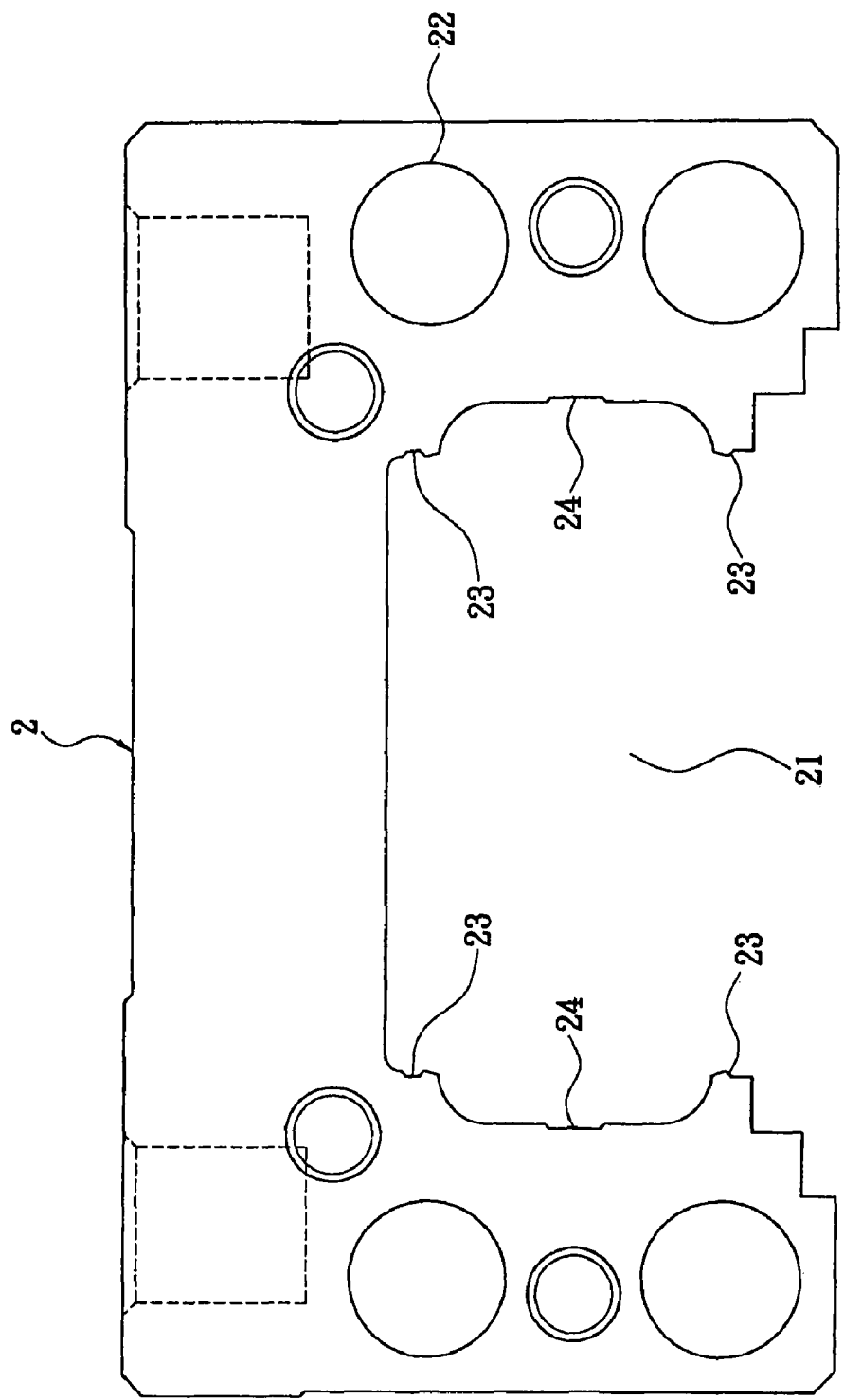
FIG. 2 is a side cross-sectional view showing the sliding base body of the circumrotating circulating guiding assembly of a linear sliding rail of the present invention.
Figure 3:
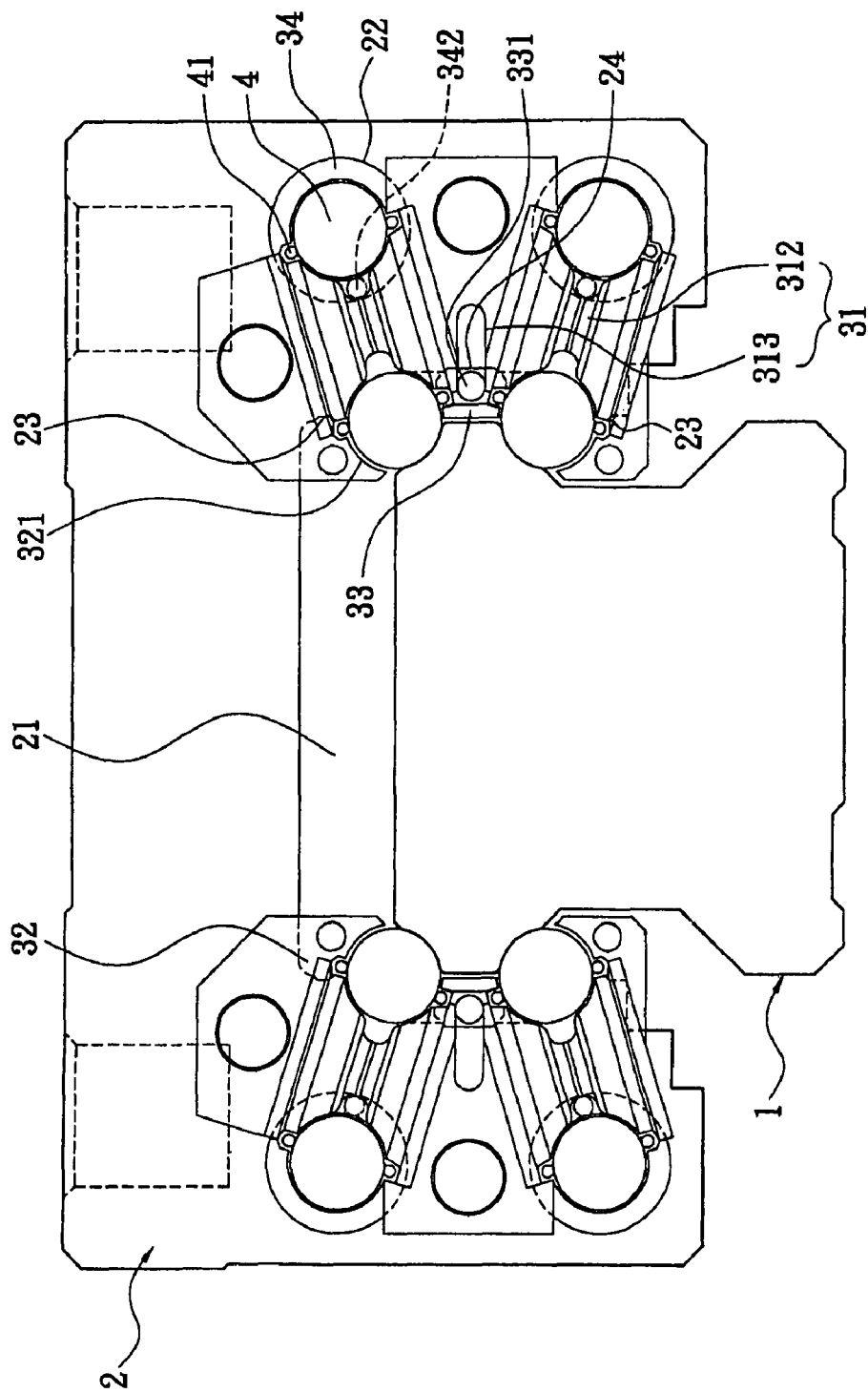
FIG. 3 is an assembled cross-sectional view showing the circumrotating circulating guiding assembly of a linear sliding rail of the present invention.
Figure 4:
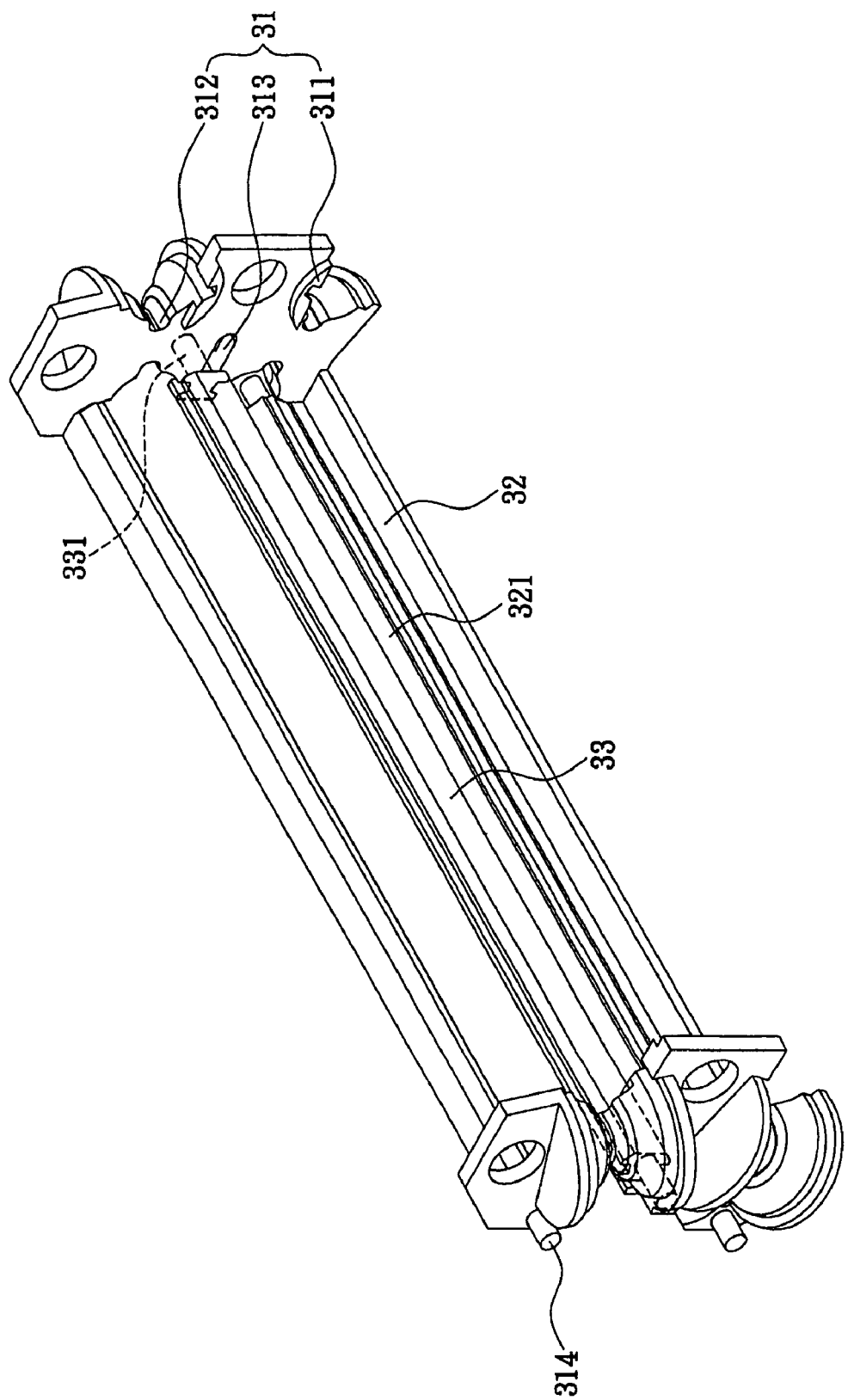
FIG. 4 is an assembled perspective view showing the guiding assembly of the present invention.
Figure 7:
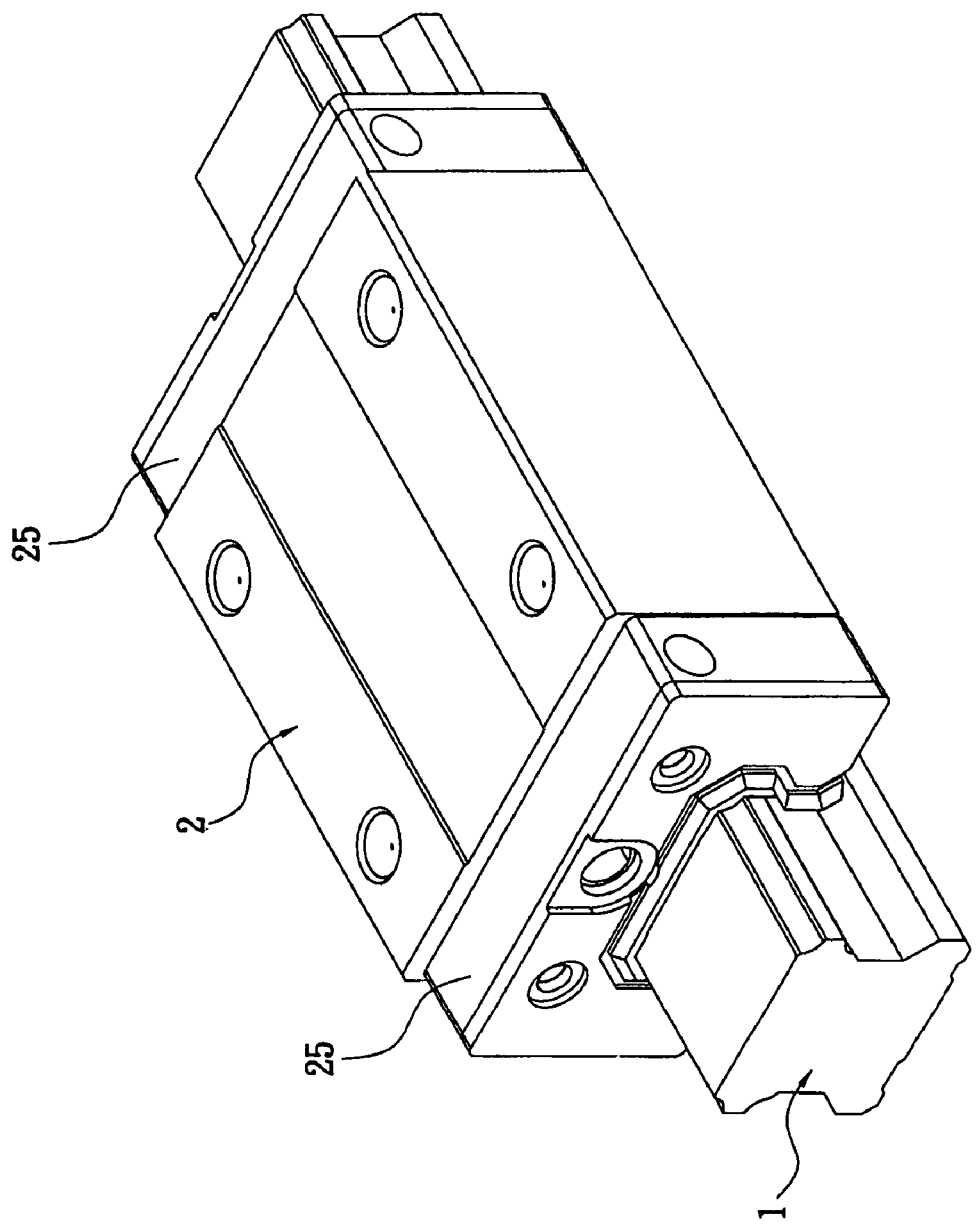
FIG. 7 is an assembled perspective view showing the circumrotating circulating guiding assembly of a linear sliding rail of the present invention.

Please refer to FIGS. 1 and 7. The sliding rail 1 is a linearly-extending elongate rail. The sliding base body 2 has an accommodating space 21 formed by recessing the bottom of the sliding base body 2. The sliding rail 1 is accommodated in the sliding base body 2.

On the surfaces of two opposing inner edges within the accommodating space 21, the sliding base body 2 is provided longitudinally with two pairs of engaging portions 23 and two recessed portions 24. The engaging portion 23 and the recessed portion 24 are all formed into open grooves by recessing from the surface of the inner side edge to communicate with front and rear end faces of the sliding base body 2. On the front and rear end faces of the sliding base body 2 adjacent to the accommodating space 21, two pairs of guiding holes 22 are provided. The guiding holes 22 penetrate through the front and rear end faces of the sliding base body 2 longitudinally.

Please refer to FIGS. 1 to 4. The two guiding assemblies 3 are made of plastic materials. Each of the two guiding assemblies 3 comprises two circumrotating guiding portions 31, two fixing pieces 32, a spacer 33 and two guiding tubes 34.

The two circumrotating guiding portions 31 are formed into semi-circular grooves for guiding the rolling elements 4 to perform a circumrotating movement. The two fixing pieces 32 and the spacer 33 are provided between the two circumrotating guiding portions 31 in a longitudinal and juxtaposing manner. The fixing piece 32 can be longitudinally fixed to the engaging portion 23, thereby enhancing the combining strength and the stability in action between the guiding assembly 3 and the sliding base body 2. The fixing piece 32 extends transversely to have a covering portion 321. The covering portion 321 is formed to correspond to the rolling elements 4 and partially covers the peripheral surface of the rolling elements 4. The spacer 33 is an elongate rod, and each end thereof has an insertion portion 331. Each of the two circumrotating guiding portions 31 has an insertion hole 313. The insertion portion 331 of the spacer 33 is inserted into the insertion hole 313, so that the spacer 33 can be provided between the two fixing pieces 32 and in parallel thereto. One side of the spacer 33 is engaged into the recessed portion 24, and the other side thereof abuts against the side edge of the sliding rail 1, thereby allowing the rolling elements 4 to roll on the guiding assembly 3 separately.

The two guiding tubes 34 are inserted into the guiding holes 22 respectively. The circumrotating guiding portion 31 has a plurality of opposing first combining portions 311. The first combining portion 311 is protruded to correspond to the profile of the end face of the guiding tube 34. Each end of the guiding tube 34 has a second combining portion 341. The second combining portion 341 is recessed to correspond to the first combining portion 311. The first combining portion 311 of the two circumrotating guiding portions 31 are extended into the guiding holes 22 and are combined with the second combining portions 341 on both ends of the guiding tube 34, thereby achieving the fixing and positioning effect. The circumrotating guiding portion 31 is circumferentially formed with a curved groove 312. Both end faces of the guiding tube 34 adjacent to the second combining portion 341 are provided thereon with a protruding portion 342. The protruding portion 342 can be arranged in the curved groove 312.

In assembling, the protruding portion 342 has effects of guiding the assembling process and positioning precisely. Via the arrangement, the convenience and precision of assembling the guiding assembly 3 can be enhanced.

The sliding rail 1, the sliding base body 2 and the guiding assembly 3 together form a circumrotating circulating path that can serve as a continuous action path of a circulating movement for the rolling elements 4. The rolling elements 4 are rolling balls or rolling posts that are provided in a holder 41 in series. The holder 41 allows the rolling elements 4 to act stably on the circumrotating circulating path, thereby avoiding improper collisions and vibration. The rolling elements 4 together with the holder 41 are provided on circumrotating circulating path in a rolling manner.

Please refer to FIG. 7. Each of the front and rear end faces of the sliding base body 2 is covered with a cover 25 that is formed to correspond to the end face of the sliding base body 2. The inside of the cover 25 has a plurality of curved grooves 251 corresponding to the circumrotating guiding portions 31. The curved groove 251 and the circumrotating guiding portion 31 together guide the rolling elements 4 to circumrotate at an outlet of the guiding hole 22, thereby achieving the circulating movement. The inside of the cover 25 has a plurality of first mounting holes 252 that are provided in the vicinity of the periphery of the curved groove 251 to correspond to the mounting portion 314.

The circumrotating guiding portion 31 is provided with a mounting portion 314. The mounting portion 314 is a protruding pillar and is inserted into the first mounting hole 252 of the cover 25.

In assembling, first, the guiding tubes 34 are inserted into the guiding holes 22 respectively. Then, the two guiding assemblies 3 are arranged to straddle the front and rear ends of the sliding base body 2 from the two inside surfaces of the accommodating space 21. Further, the fixing pieces 32 and the spacer 33 are arranged in such a manner that they correspond to the engaging portions 23 and the two recessed portions 24 respectively. The spacer 33 abuts between the sliding rail 1 and the sliding base body 2. The rolling element 4 is disposed between the sliding rail 1 and the sliding base body 2 via the guiding assembly 3. Finally, the two covers 25 are used to cover the front and rear end faces of the sliding base body 2.

Figure 5:
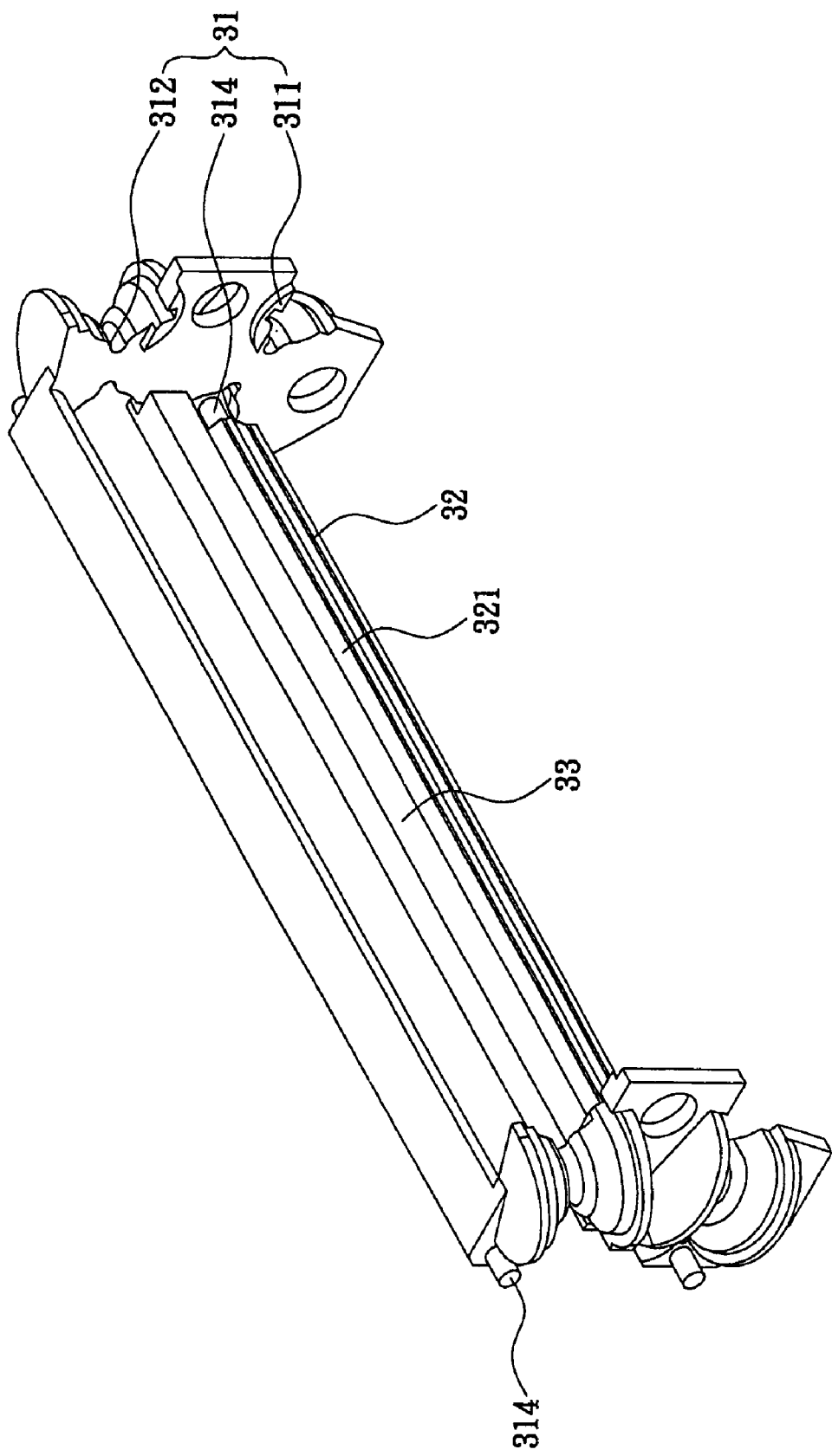
FIG. 5 is a perspective view showing another embodiment of the guiding assembly of the present invention.

Please refer to FIG. 5, in which another embodiment of the spacer 33 is shown. The spacer 33 can be integrally formed on the guiding assembly 3. The rolling elements 4 can be provided on the guiding assembly 3 directly without the holder 41.

Figure 6:
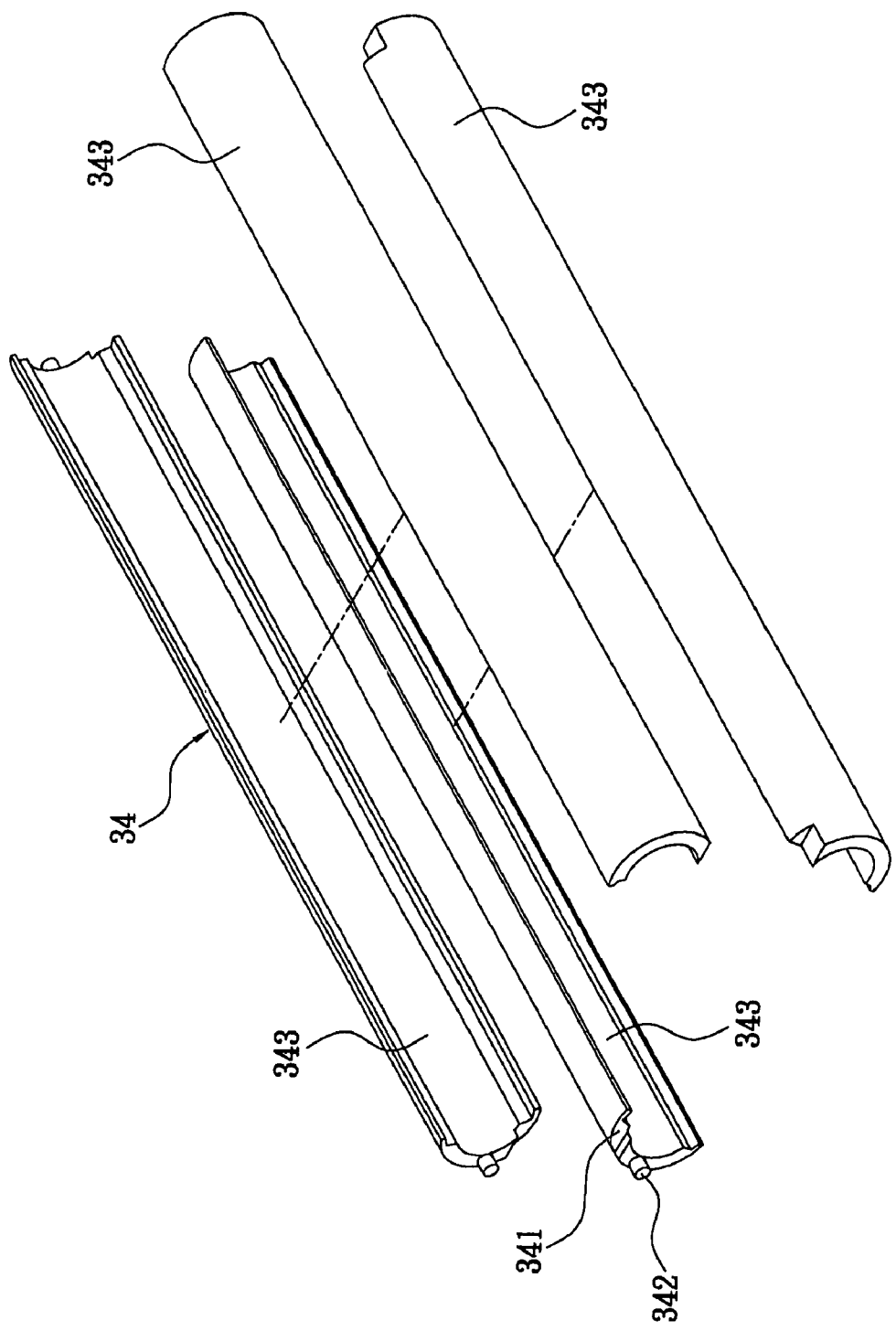
FIG. 6 is a perspective view showing another embodiment of the guiding tube of the present invention.

Please refer to FIG. 6, in which another embodiment of the guiding tube 34 is shown. The guiding tube 34 can be constituted of two semi-circular tubes 343. Such kind of construction can substantially reduce the difficulty in a mold-releasing step during a molding process, thereby obtaining a better effect of formation.

Figure 8:
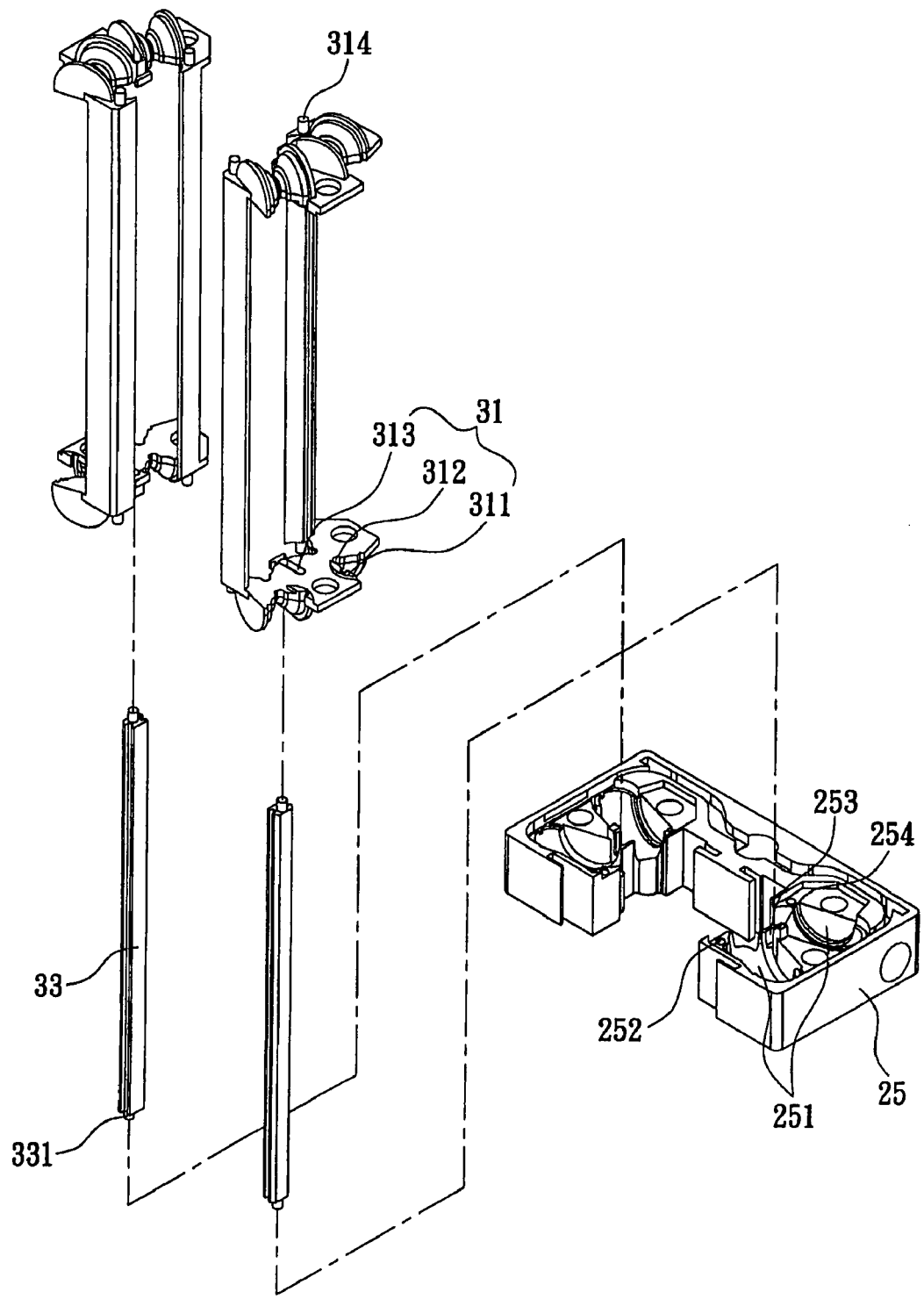
FIG. 8 is a perspective view showing another embodiment of the cover of the present invention.
Figure 9:
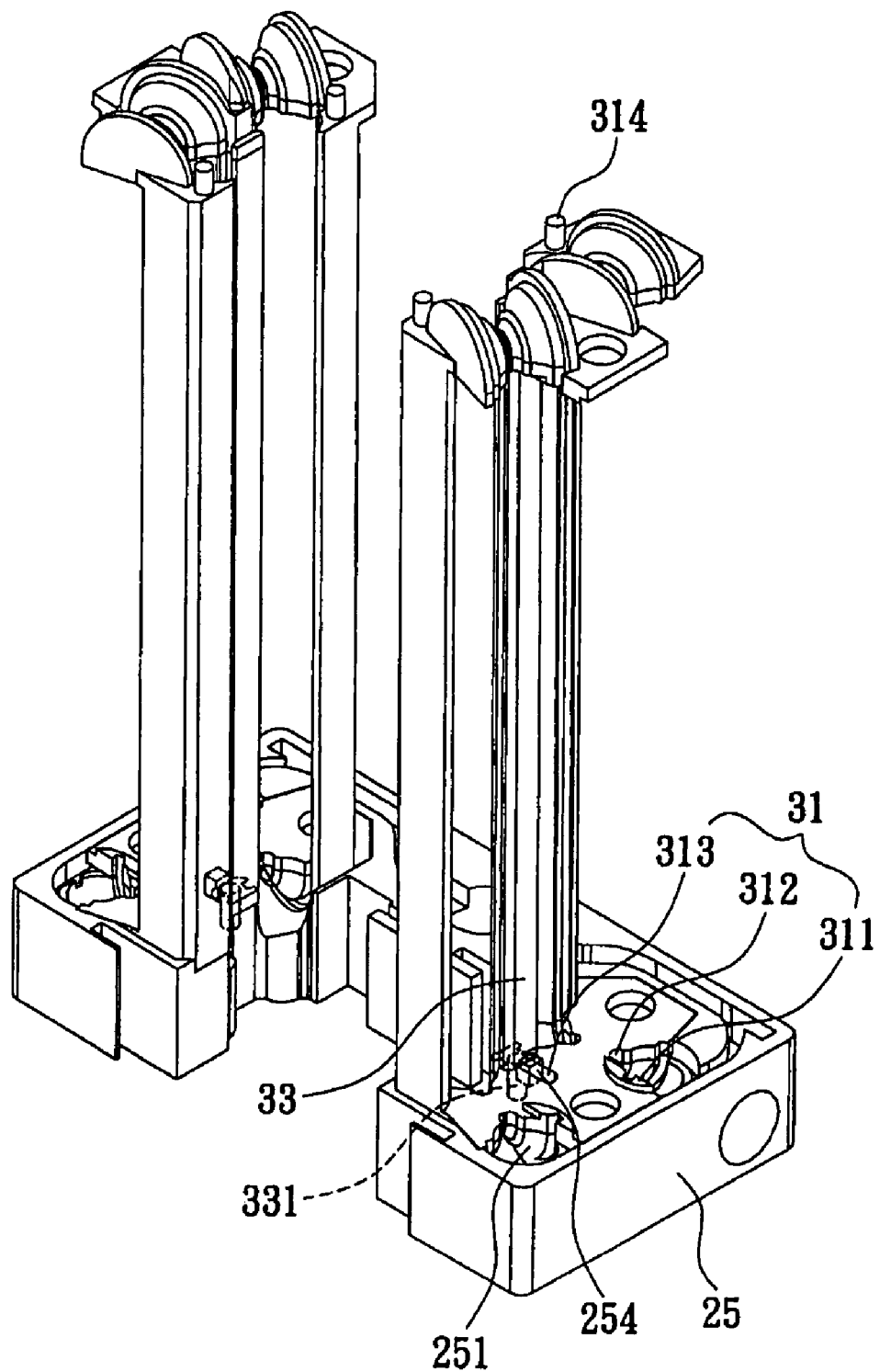
FIG. 9 is an exploded perspective view showing another embodiment of the cover of the present invention.

Please refer to FIGS. 8 and 9. The inside of the cover 25 are provided with two opposing second mounting holes 253 that are provided between the two curved grooves 251 to correspond to the insertion portions 331. At a position inside the cover 25 and adjacent to the second mounting hole 253, a positioning block 254 is provided. The positioning block 254 is protruded to correspond to the insertion hole 313. Via this arrangement, the positioning block 254 can be accommodated in the insertion hole 313. Further, the insertion portion 331 of the spacer 33 can penetrate into the insertion hole 313 and simultaneously abuts against the positioning block 254. In this way, the circumrotating guiding portion 31 and the spacer 33 can be provided inside the cover 25 precisely so as to cover the front and rear end faces of the sliding base body 2 (as shown in FIG. 7).

Figure 10:
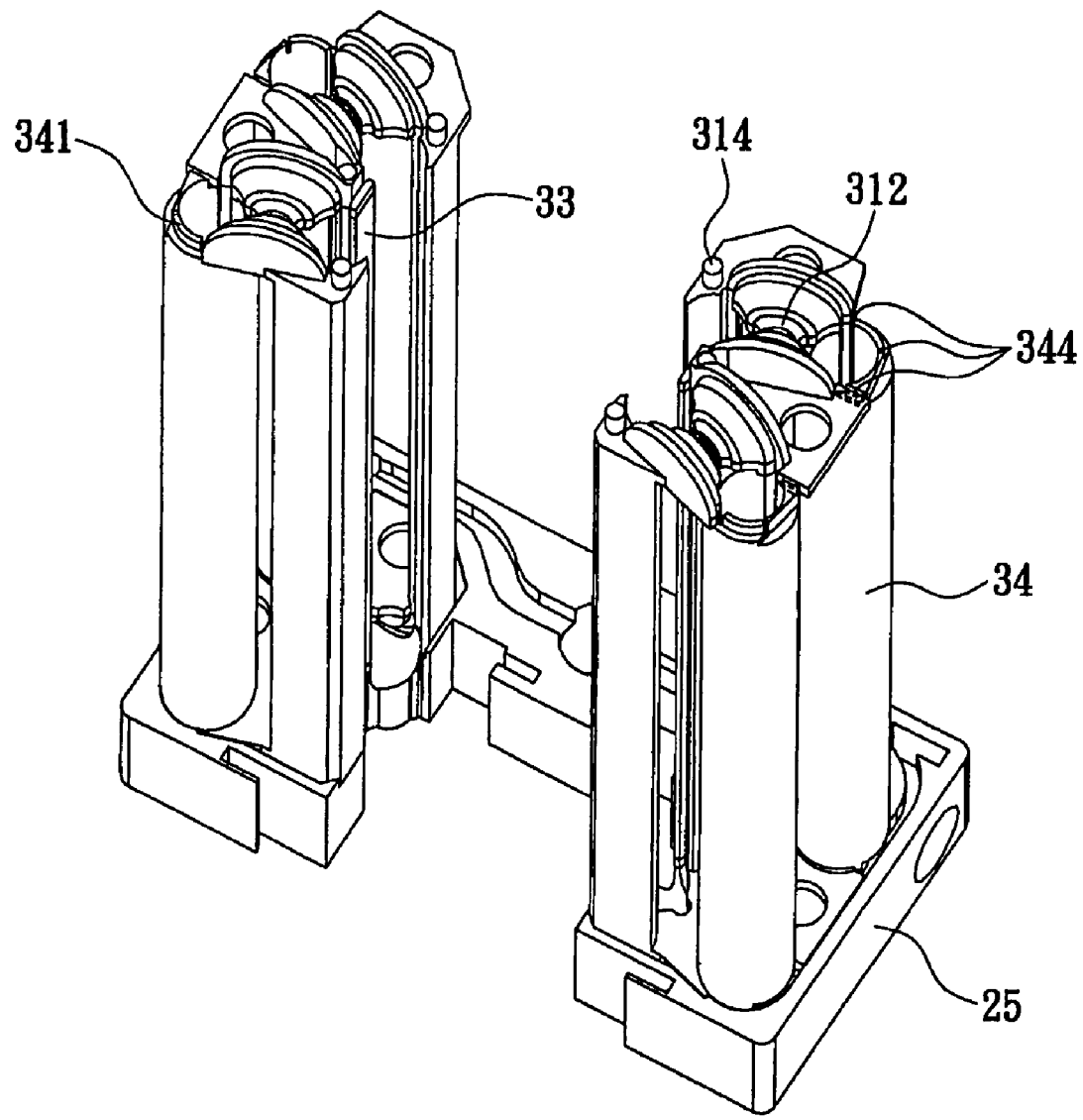
FIG. 10 is a perspective view showing an oil-injecting channel of the guiding tube of the present invention.

Please refer to FIG. 10. The guiding tube 34 has a plurality of oil-injecting channels 344 that are provided on both ends of the guiding tube 34. The connecting position between the guiding tube 34 and the circumrotating guiding portion 31 forms a channel that is in communication with the inner and outer edge surfaces of the guiding tube 34, thereby allowing lubricants to pass through and thus making the action of the rolling elements 4 more smoothly.

Via the action of the guiding assembly 3, the rolling elements can perform a circumrotating circulating movement between the sliding base body 2 and the sliding rail 1, thereby allowing the sliding base body 2 to perform a linear movement on the sliding rail 1 smoothly.

Incidentally, during the molding process and when a mold-releasing step is to performed, the geometrical profile of the guiding assembly 3 in a transverse direction (i.e. with respect to the direction of the shorter side) can allow the mold-releasing step to be performed directly without providing any draft taper (or merely a relatively small draft taper is needed). In this way, the size of the guiding assembly 3 can be made with a better precision, and thus a better working performance can be obtained during the circumrotating circulating movement.

The features and functions generated by the present invention are summarized as follows. With the fixing pieces 32 of the guiding assembly 3 being fixed to the engaging portions 23 of the sliding base body 2, and the spacer 33 being engaged in the recessed portion 24, the insufficient strength of the guiding assembly 3 formed of plastic materials can be compensated, so that the rolling elements 4 can perform a circumrotating circulating movement stably along the guiding assembly 3, thereby avoiding the vibration, noise and excessive frictional resistance. In this manner, the stability in the action of the linear sliding rails can be enhanced and the lifetime thereof can be extended.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A circumrotating circulating guiding assembly of a linear sliding rail, comprising:

a sliding rail;

a sliding base body having an accommodating space, a plurality of engaging portions, two recessed portions and a plurality of guiding holes, the accommodating space being recessed to accommodate the sliding rail; the engaging portions and the recessed portions being provided longitudinally on inner edge surfaces of the sliding base body, the guiding holes penetrating through front and rear end faces of the sliding base body;

a plurality of guiding assemblies provided in the accommodating space to straddle the front and rear end faces of the sliding base body and to correspond to the engaging portions and the guiding holes; each of the guiding assemblies including two circumrotating guiding portions, a plurality of fixing pieces, a spacer and a plurality of guiding tubes, the two circumrotating guiding portions being provided on the front and rear ends of the sliding base body respectively, the fixing pieces and the spacer being provided between the two circumrotating guiding portions, each fixing portion being fixed to a respective engaging portion, one side of the spacer being engaged in the recessed portion, the guiding tubes being inserted individually into the guiding holes, each of the two circumrotating guiding portions having a plurality of first combining portions, both ends of each guiding tube having a second combining portion, each first combining portion being provided in a respective guiding hole and combined with the second combining portion of a respective guiding tube; the sliding rail, the sliding base body and the guiding assembly together forming a circumrotating circulating path;

a plurality of rolling elements provided on the circumrotating circulating path in a rolling manner; and a pair of covers covering the front end and the rear end of the sliding base body, and wherein each cover has a contour corresponding to that of the front and rear ends of the sliding base body;

wherein each end of the spacer has an insertion portion, each of the two circumrotating guiding portions has an insertion hole, the insertion portion is inserted into the insertion hole, the cover further comprises a positioning block, the positioning block is protruded from the inside of the cover and is provided in the insertion hole of the circumrotating guiding portion.

2. The circumrotating circulating guiding assembly according to claim 1, wherein both ends of each guiding tube have a protruding portion, each circumrotating guiding portion is formed with a curved groove, and the protruding portion is provided in the curved groove.

3. The circumrotating circulating guiding assembly according to claim 1, wherein each guiding tube is constituted of two semi-circular tubes.

4. The circumrotating circulating guiding assembly according to claim 1, wherein each fixing piece extends to form a covering portion, and the covering portion partially covers the rolling surface of the rolling elements.

5. The circumrotating circulating guiding assembly according to claim 1, wherein the other side of the spacer abuts against the sliding rail.

6. The circumrotating circulating guiding assembly according to claim 1, wherein the rolling elements are provided in a holder to roll on the circumrotating circulating path together with the holder.

7. The circumrotating circulating guiding assembly according to claim 1, wherein the rolling element is a rolling post or rolling ball.

8. The circumrotating circulating guiding assembly according to claim 1, wherein the two covers have curved grooves to correspond to the circumrotating guiding portion.

9. The circumrotating circulating guiding assembly according to claim 1, wherein each of the two circumrotating guiding portions has a mounting portion, the mounting portion is mounted into the cover.

10. The circumrotating circulating guiding assembly according to claim 1, wherein each first combining portion is formed by extending from the inside surface of each circumrotating guiding portion and is flush with an edge of the guiding assembly, each first combining portion is protruded to correspond to the profile of the end face of each guiding tube, each second combining portion is recessed to correspond to a respective first combining portion, and each first combining portion is combined with a respective second combining portion.

11. The circumrotating circulating guiding assembly according to claim 1, wherein each guiding tube further has a plurality of oil-injecting channels that are provided on both ends of the guiding tube.

* * * * *